United States Patent

[11] 3,580,065

[72] Inventors David J. Strittmater;
Nicholas W. Voelker, La Crosse, Wis.
[21] Appl. No. 822,558
[22] Filed May 7, 1969
[45] Patented May 25, 1971
[73] Assignee Universal Oil Products Company
Des Plaines, Ill.

[54] LAMINATE BOND PEELING STRENGTH TESTER
10 Claims, 7 Drawing Figs.
[52] U.S. Cl. .................................................. 73/150,
73/95
[51] Int. Cl. ...................................................... G01n 19/04
[50] Field of Search .......................................... 73/150, 95

[56] References Cited
UNITED STATES PATENTS
2,834,205 5/1958 Pickup ......................... 73/150
2,989,865 6/1961 Belfour ......................... 73/150
3,019,644 2/1962 Mancini ....................... 73/150
3,129,586 4/1964 Allen et al. ................... 73/150
3,253,461 5/1966 Blanchard et al. ............ 73/150

Primary Examiner—Louis R. Prince
Assistant Examiner—Daniel M. Yasich
Attorneys—James R. Hoatson, Jr. and Philip T. Liggett ABSTRACT: An apparatus for testing of laminate bonds having in a preferred embodiment a vacuum plate holddown device attached to a vertically movable fluid power-operated piston. A tension gage and clamping device is suspended above the piston and is free to move in a horizontal plane. The vacuum plate holds the sample in position while the clamping device is attached to a turned up strip of laminate. While being held in this position, the piston is moved downward at a fixed rate of speed, and the gage is read indicating the amount of forces exerted as the laminate is being peeled. In another embodiment a heating element and mechanically operated holddown device is provided therein to provide for testing under elevated temperatures.

PATENTED MAY 25 1971 3,580,065

INVENTORS:
David J. Strittmater
Nicholas W. Voelker
BY:
ATTORNEYS

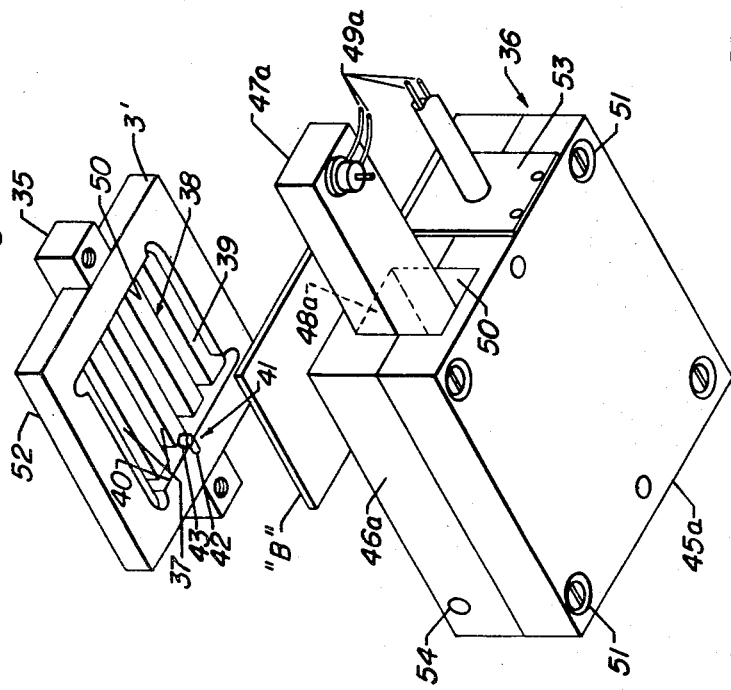
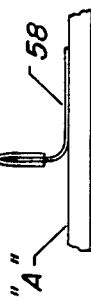
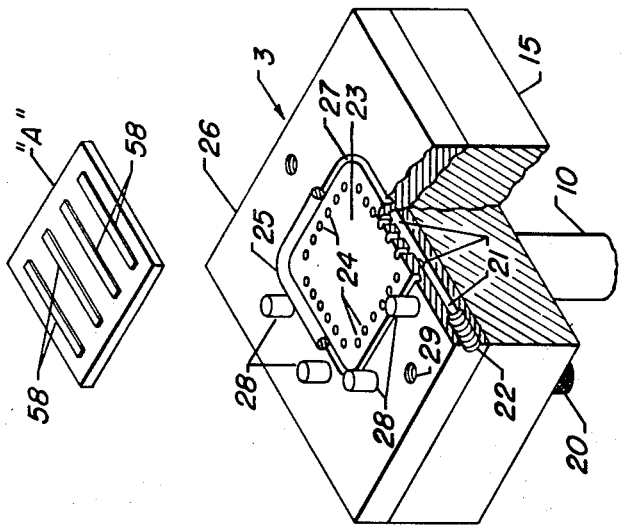
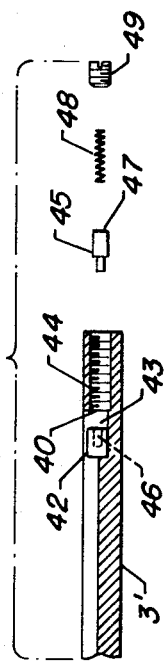

LAMINATE BOND PEELING STRENGTH TESTER

This invention provides for an apparatus for testing of laminate bonds and particularly to the testing of the degree of adhesion between the copper circuit and the laminated plastic of a printed wiring board.

One of the many critical factors effecting the performance of the printed wiring boards is the degree of adhesion between the copper circuit and the laminate plastic or other material. The laminate manufacturers as well as users, make sure adhesion requirements are met by subjecting samples to peel testing, as for instance, the military specification for plastic sheet laminated in copper clad. (MIL-P-13949). As a typical test procedure, these specifications require that a circuit board sample be first etched to form a series of copper strips. Each sample is then fixed on a horizontal plane and the strips of copper are initially peeled to project upward for approximately one inch. Each strip is then clamped to a tension gauge or tensile tester, which is capable of indicating force to the operator. After clamping, a force is exerted on each strip in a vertical plane and the strip is peeled from its bond at a fixed rate of speed, while the minimum load exerted is observed on the gauge.

Heretofore various types of laminate bond testers have been utilized to meet such test specifications, however, with the increased emphasis on product reliability and the need for high volume testing, it has been found that these available peel testers have had their limitation, for although, they do do a satisfactory job, they are cumbersome and difficult to work with, particularly at elevated temperature testing.

Most common methods of testing multilayer laminates, require that the sample be rigidly mounted to prevent the sample from flexing during the peel test. In one prior procedure, the sample is bonded to an inflexible substructure with adhesive. Another procedure locates and holds it mechanically in place with a holddown device. Both are very time consuming, since in addition to the difficulty in initially clamping the sample in place, the sample has to be mechanically relocated for each strip of copper tested.

The military specifications require that at least four strips be tested on each sample, and this would thus require a new clamping down operation for each strip. An additional problem is created when testing under elevated temperatures, since the sample may be at a temperature of as high as 400° F., thus becoming difficult to handle.

It is therefore an object of this invention to provide for a laminate bond tester that provides consistent and reliable data for standard copper clad laminates as well as other multilayer materials.

Another object of this invention is to provide for a laminate bond tester than can test bonds quickly and efficiently.

It is a more specific object of this invention to provide for a laminate bond tester that has within its embodiment an efficient and fast sample holddown device.

Another object is to provide for a laminate bond tester that requires only one holddown operation for each sample piece tested.

Still another object of this present invention is to provide a laminate bond tester that has a heat source embodied within it to provide for controlled temperature increases of test samples.

In a broad aspect, this invention provides for an apparatus for testing of laminate bonds, comprising in combination a substantially vertically movable, supporting member, such member including means to cause it to move vertically at predetermined rates of speed, a holddown plate means affixed to the upper end of said movable support member, whereby an article to be tested can be clamped in position, a tension gauge means positioned above said holddown plate means, such means attached to a gauge holding means which permits said gauge means to move freely in a horizontal plane but fixes said gauge means vertically, and a laminate clamping means attached to said gauge means.

In a preferred embodiment of this particular apparatus, the movable supporting member is a piston and cylinder combination operated by pneumatic means. The holddown plate means comprises a vacuum plate with a plurality of hollow passageways therein. These passageways are in communication with the center upper surface of the plate and also with a vacuum supply. The samples to be tested are clamped into position by the activation of the vacuum supply which causes them to be held to the center region thereof. Usually, to effectuate an efficient vacuum bond, a sealing means is placed on the upper surface between the peripheral edge of the vacuum plate and the center region. In addition, projections, transverse to the surface, are provided to aid in the location of samples within this center region.

Another form of the holddown plate means is normally used in conjunction with a heating element means. This particular holddown plate comprises a flat plate with a center recessed region. This recessed region has a slotted surface, with the slots being in communication with the opposite side of the plate. Therefore, when a sample is placed face down, within the recessed region, the copper strips are reachable from the opposite side. To initially maintain the samples in place, an offsetting spring means is located on the interior wall of the recessed region. This spring means is biased to exert pressures inwardly when articles are placed within the center region. They are thus, laterally forced to abut the opposite interior wall of the recessed region to be held in place. This holddown plate is clamped, with copper strips facing upward through the slots, to a heating element means for use in tests requiring elevated temperatures. To provide for ease in changing of these various components to the piston, a horizontal work plate is attached to the upper end thereof.

As mentioned hereinbefore, the tension gauge means is positioned above said holddown plate means and is free to move in a horizontal plane. This is accomplished in one embodiment by attachment to a gauge holding means, comprising a gauge mount housing and bearing assembly, a slide housing and bearing assembly, and a fixed slide bracket assembly. The gauge means is attached to the aforementioned gauge mount housing and bearing assembly, which is free to translate horizontally upon the slide housing and bearing assembly. This in turn is free to translate horizontally at right angles to the initial translation on the fixed slide bracket assembly.

The gauge holding means is attached to an adjusting head means which provides for the means to change the vertical distance between the tension gauge means and the sample located on one of the holddown devices. It can be adjusted to different vertical distances by mere rotation of a screw means.

Reference to the accompanying drawing and the following description thereof will serve to point out and more fully illustrate the design and construction of our invention as well as assist in pointing out advantageous features in connection therewith.

DESCRIPTION OF THE DRAWING

FIG. 3 is a schematical isometric view of the vacuum plate holddown means.

FIG. 4 is a schematical isometric view of one form of holddown means shown in conjunction with a heating element means.

FIG. 5 is an enlarged sectional view of an embodiment of the offsetting spring means.

FIG. 6 is a longitudinal view of a portion of the laminate bond tester illustrating the holding member and clamping means of the gauge means.

Referring more particularly to the drawing, FIG. 1 illustrates a preferred embodiment of the improved laminate bond tester 1. As shown, it basically consists of movable supporting member 2, holddown plate means 3, gauge means 4, which is held above holddown means 3 by the gauge holding means 5 and adjustable head 6, and a base section 7.

Figure 1:
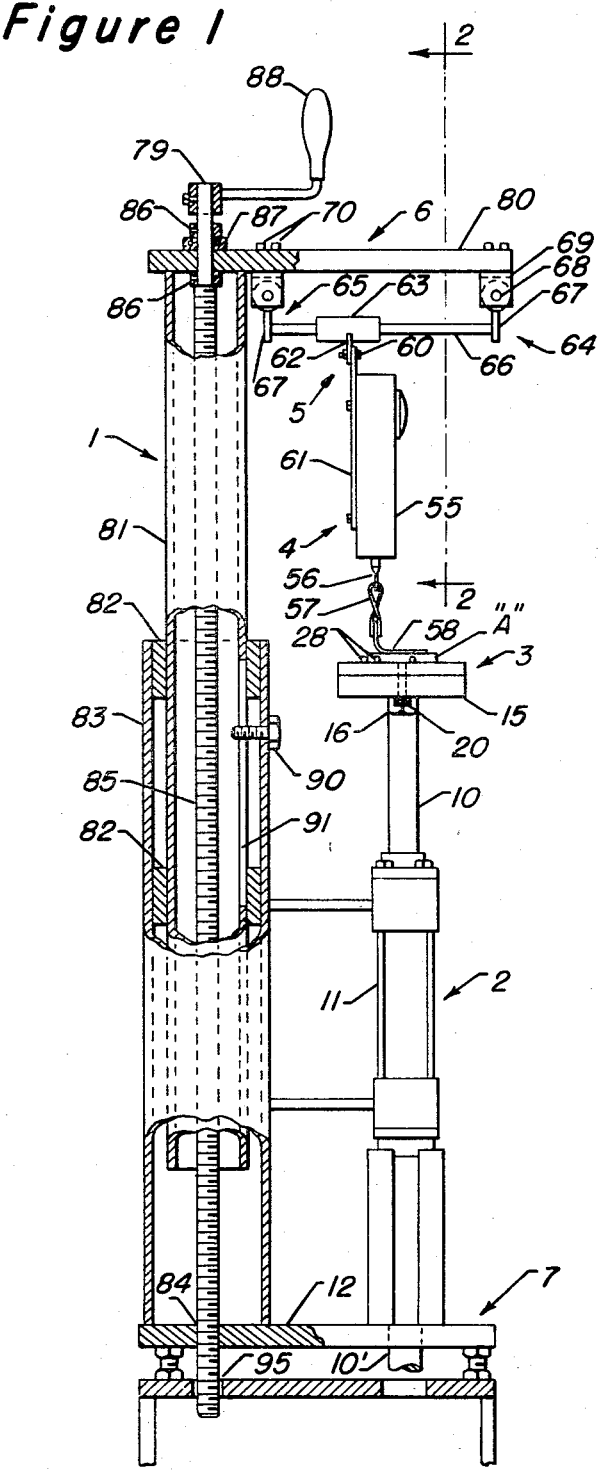
FIG. 1 is a longitudinal partial sectional view of a preferred embodiment of the laminate bond tester.

Referring to these various components in more detail, it is seen that movable supporting member 2 consists basically of a piston member 10 which is constructed to move vertically by the activation of a two-way pneumatic cylinder 11, which has its downward stroke controlled by a hydraulic check cylinder (not shown). The check cylinder would be located on a horizontal base 12 next to cylinder 11, and its piston which would extend through base 12 to be connected in parallel with the lower extension 10' of piston 10. The hydraulic check cylinder is equipped with a flow control device, thus allowing for the precise controlled speed of piston 10 on its downward stroke.

Cylinder 11, piston 10 and the hydraulic check cylinder, are standard components and their details of construction are not considered as part of this present improvement, however, they must satisfy certain requirements to fall within the scope of this improvement. Of course, since the test as described hereinbefore is a tension test, the cylinder must be structurally and mechanically capable of pulling loads in the ranges of the test, as for example, in testing of circuit boards with copper foil dimensions of from 0.0007 to 0.007 inch, a cylinder having an inlet pressure of 100 p.s.i.g., and having 315 pounds of thrust would suffice. The piston and cylinder must also be capable of pulling loads with uniform velocities, since, in the aforementioned test, velocity is the independent variable, and therefore, it must be kept uniform. For instance, to meet MILP–13949 test specification for copper laminate, this speed should be 2±0.1 inches per minute. In a preferred form of the laminate bond tester, this rate of speed is not fixed but is adjustable to give additional latitude in the testing of other materials under different specifications. The control means and supply for the pneumatic cylinder 11 are not shown in FIG. 1, but would be placed, for operating convenience, on or near baseplate 12 in clear view and reach of the operator.

Other forms of movable supporting members are considered as within the scope of this present invention, as for example, a mechanically driven movable supporting member may be utilized, or one operated through a hydraulic piston and cylinder may be suitable for use in various testing procedures.

Attached to the piston 10 is a work plate 15 which is initially screwed on to threaded end portion of piston 10 and then locked into position by lock nut 16. Work plate 15 provides a deck to which the holddown means can be fastened to. Plate 15 is not absolutely necessary, however, it does facilitate easy installation and removal of the various components, as will hereinafter be described.

Attached to work plate 15, with two hand bolts 20, is a preferred form of holddown means, that being vacuum plate 3 which is more clearly illustrated in FIG. 3. It is to be noted that by utilizing a hand bolt design, the changing of holddown plates, and other components is facilitated without the use of wrenches or other similar tools, thus saving time in operation of the laminate tester. Plate 3 consists of a flat plate with hollow passageways 21 therein. At least one of the passageways is in communication with an exterior side of plate 3 via the threaded hole 22. Threaded hole 22 is of standard threaded pipe size and is adapted for connection by a flexible connector to a vacuum supply means.

In communication with the central region of the top surface 23 of plate 3 are vertical passageways 24 leading from passageways 21. A flexible sealing means 25, such as an O-ring or other suitable sealing means, is placed around passageways 24 between them and the peripheral edge 26 of plate 3. In this present embodiment, sealing means 25 is kept in position by the channel 27 provided on surface 23. Also provided on the surface 23 between passageways 24 and the peripheral edge 26 are transverse projections 28 which are used as placement means for samples to be tested. In other words, when a sample is to be held into position, it is merely placed to abut the projections 28 which define two intersecting lines. The location of projections 28, therefore, must coincide with the anticipated size of samples as well as with the location of sealing means 25 and passageways 24. Also provided on plate 3 are threaded holes 29 for attachment to work plate 15.

As mentioned previously, a vacuum supply means is connected to plate 3 at threaded portion 22. The vacuum supply means, of course, must create sufficient vacuum pressures to adequately bond the test sample to be placed on plate 3. The means by which the vacuum supply is obtained is not considered part of this invention and may be any standard method known to those skilled in the art. It has been found that for test samples of 2 inches by 2 inches and a holddown plate with passageways 24 having a cross-sectional area of approximately 0.1 square inch, that vacuum equipment supplying 25 inches HG. gauge pressure will adequately bond the sample to sustain loads of 5 pounds. An "on-off" valve (not shown) is also to be provided to release or activate the vacuum bond when desired.

Figure 1A:
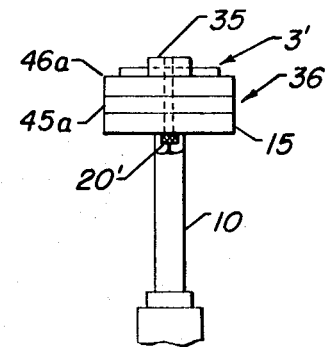
FIG. 1a is a longitudinal partial view of an embodiment of the laminate bond tester utilizing a preferred form of a heating element means.
Figure 2:
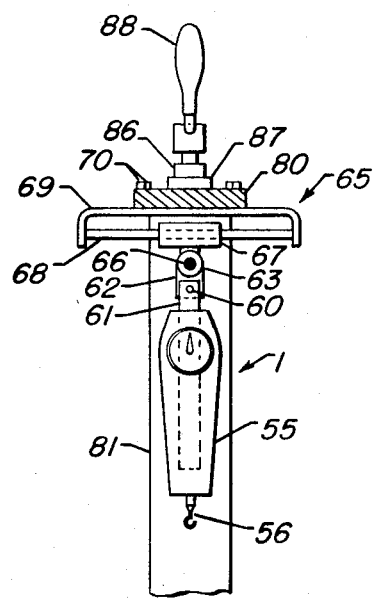
FIG. 2 is a longitudinal partial sectional view of the embodiment of FIG. 1 taken through line 2–2.

An alternate form of the holddown means 3' is shown attached to work plate 15 in FIG. 1a by hand bolts 20' and blocks 35. In this particular embodiment, plate 3' is being utilized in conjunction with a heating element means 36 which is clamped between plate 3' and work plate 15. It is desirable that plate 3' be of a material having a high thermal conductivity factor, such as aluminum, so as to aid in the transfer of heat from heating element 36 to the test sample. A more detailed illustration of plate 3' is given in FIG. 4. As shown, plate 3' is recessed in its center region 38 for the initial placement of samples, in their inverted position, upon the recessed surface 39.

Located on one side of wall 40 of this recessed region is an offsetting spring means 48 which is biased to exert pressures inwardly. Spring means 48 may be merely a compression type spring attached to wall 40, or as shown in FIGS. 4 and 5, an adjustable spring device which is actually a commercial standard spring plunger normally used for tooling dies. One component of this particular adjustable spring device is a retaining plug 42 which is a cylindrically shaped rigid piece of material that is placed in slot 43 provided in plate 3'. Threaded hole 44 is located in plate 3' to coincide with slot 43. It is in communication with slot 43 and with the exterior wall of plate 3'. Placed within hole 44 is a cylindrically shaped sliding pin 45 which is formed to slide freely within hole 44 and to be mated with slug 42 in opening 46. Abutting pins 45 at 47 is compression spring 48 which is placed within hole 44 and which is maintained in pressure contact against the sliding pin 45 and the retaining slug 42 by the setscrew 49. By utilizing setscrew 49, the spring may be replaced or adjusted to exert various degrees of pressure upon samples placed within the recessed region.

As illustrated in FIG. 4, the center region 38 of plate 3' has a surface which is slotted with four openings 37, which extend clear through to the opposite surface 52. These slots are located to coincide with the copper strips (not shown) that have been etched on the test sample B. When a sample is to be clamped into place, it is inserted face down on recessed surface 39 and then forced against retaining slug 42 until it clears the opposite wall 50 of the recessed region 38. Once it clears wall 50, it is released by the installer and thus forced by the spring means 48 to abut wall 50. The spring means is utilized to prevent the sample from falling from plate 3' when it is inverted to its normal position.

Of course, this particular holddown means may be utilized without heating element means 36 and clamped directly to work plate 15 utilizing blocks 35 and hand bolts 20' after a test sample is placed within recessed region 38; however, the vacuum plate holddown means is by far the most convenient form of clamping test samples into place and will usually be used when elevated temperatures are not required. On the other hand, it is contemplated that plate 3' will normally be used in conjunction with heating element means 36, since it establishes a more direct contact with the heating element and the test sample.

Heating element means 36 consists basically of insulating plate 45a a conducting plate 46a, and two electrical resistant heating elements 47a. Elements 47a are inserted completely into channels 48a which are provided for in plate 46a and extend almost completely therethrough. Conducting plate 46a is formed from a suitable heat conducting metal such as aluminum or copper. Necessarily insulating plate 45a is made from a suitable material having insulating characteristics such as transite, to protect the work plate from high temperature and to conserve heat energy. The elements 47a are, of course, connected to an electrical supply source with wires 49a. Such source is to have the necessary controls to provide for control of output. The channel 50, located in insulating plate 45a allows for clearance of the connection means of wires 49a. After insertion, the ends of elements 47a, which are completely covered by plates 45a and 46a, are packed with an asbestos-type material and kept within the plate components by an insulated retainer plate 53. The two plate components 45a and 46a, are clamped together through countersunk bolts 51 which are screwed into conducting plate 46a. The complete heating element means 36 is clamped with hand bolts 20' between plate 3' and work plate 15 using blocks 35. Normally, since test sample thickness is variable, aluminum shims will be used to fill the gap between the bottom of the test sample and the top surface of heating element 36 for optimum heat transfer.

A sensor from a temperature controller is inserted into conducting plate 46a through the drilled hole 54. It, in conjunction with the controller, (not shown) provides the means by which to measure and determine the temperatures reached by the samples being tested. After heating to the predetermined temperature, the copper strips, which have been initially turned to extend upward approximately 1 inch, are pulled up through slots 37 and clamped to gauge means 4 which will hereinafter be described in more detail.

Held above holddown means 3 is a tension gauge means 4 which basically consists of a tension spring gauge 55 having a dial calibrated to measure loads in pounds and designed to be within the limits of the testing operation. It is of standard construction having a holding member or hook 56 located at its lower end. Hook 56 is shown with clamping means 57 attached to it. Clamping means 57 is basically a spring-actuated clamp with knurled claws which is used to clamp strips of copper foil 58 thereto, as shown in FIGS. 1, 3 and 6. Gauge 55 is attached to gauge holding means 5 at 60 utilizing vertical bracket 61 and gauge mount bracket 62. The gauge holding means 5 consists of a gauge mount housing and bearing assembly 63, a slide housing and bearing assembly 64, and a fixed slide bracket assembly 65. The gauge mount housing and bearing assembly 63, which has the vertical bracket 62 fixed to its lower side, is basically a housing for a ball bearing bushing which is mated to slide in a "frictionless" manner on horizontal bar 66.

Horizontal bar 66 is part of the slide housing and bearing assembly 64 which consists of bar 66 and two sets of housing brackets 67. Bar 66 is attached to housing brackets 67 which in turn houses ball bearing bushings. These two ball bearing bushings are in turn mated to freely slide on horizontal bars 68 in a "frictionless" manner. Bars 68 are part of a fixed slide bracket assembly 65, the other parts being brackets 69 to which they are attached. Slide bracket assembly 65 is attached in turn to adjustable head 6 through bolts 70.

The gauge holding means 5 provides a system wherein gauge 55 is completely free to move in a "frictionless" manner in a horizontal plane. Since there is a slight chance of binding when there is a change in direction, and since the strips of copper are usually placed in a unidirectional manner, the direction of bar 66 is preferably made to coincide with that direction. Hence, when a typical sample is to be tested, it is initially inserted into a holddown plate in a line with bar 66, so that when a strip is being pulled the gauge will follow the direction of the pull. The gauge can be moved freely in all directions so as to allow the operator to locate holding member 56 directly over the copper strip to be peeled. When this is done, clamp 57 is clamped to a copper strip and the cylinder is activated. When activated, it pulls a strip from the sample and the gauge follows horizontally. The reason for the "frictionless", horizontal movement is to meet general testing MIL specifications, which require that when such a tension test is being made the direction of pull must be vertical to within 5°.

Adjusting head 6 as shown is actually an adjustable support, however, it is contemplated that it be permanently fixed in alternate embodiments. During the actual testing operation, it must establish a fixed support to meet test specifications. To establish an accurate testing measure, the datum for both the holddown members 3 and 3', and the gauge means 4 has been chosen in this particular embodiment to be the baseplate 12. Adjusting head 6 has as a main part horizontal support piece 80 with holes provided therein for attachment of brackets 69 and also for clearance of vertical rod 79. Support piece 80 is welded to a cylindrical guide piece 81 which is free to slide through the two bushings 82. Bushings 82 are fixed to vertical base support 83 which is welded to the horizontal baseplate 12. Baseplate 12 is provided with a threaded opening 84 which is for the mating of the threaded portion 85 of vertical rod 79. The thread design, of course, must be calculated to support the weight of the unit as well as the load of the testing operation. In order to support horizontal piece 80, two set collars 86, are set to rod 79 on both sides of horizontal piece 80 as shown. A thrust bearing 87 is inserted under the top collar to facilitate the operation of the adjustable head 6. Handle 88 is attached to the end of the rod 79 to enable the operator to turn rod 79. To prevent horizontal piece 80 from rotating while rod 79 is being turned, a bearing pin 90 is screwed into vertical base support 83 to slide within a vertical slot 91 provided in guide piece 81. To raise or lower the gauge means 4 the operator merely turns handle 88 which screws rod 79 through baseplate 12. Base section 7 is also provided with a tabletop having hole 95 therein to allow rod 79 to pass freely.

The operation of the test procedure follows: first there must be a preparation of the laminate board samples, which under standard testing specifications are 2 inches by 2 inches in size. Four copper strips of approximately one-eighth inch in width are etched out through an etching process known by those skilled in the art. The copper strips are initially peeled back approximately one inch from the laminate board, so that the strips can be gripped by the clamping means 57. If the test calls for a room temperature condition, the procedure is to utilize the vacuum holddown means plate 3. The sample shown as "A" in FIGS. 1, and 3 is placed on plate 3 to abut vertical projections 28. The vacuum is activated, and consequently, the sample is held in position. The next step is to clamp a strip of copper to gauge means 4 utilizing clamping means 57. This is a simple manual operation, the result being schematically illustrated in FIGS. 1 and 6. The gauge 55 is easily moved into position over the copper strip to be tested because of "frictionless" movement of the gauge holding means 5 hereinbefore described. After the gauge is clamped into position, the cylinder 11 is activated with it's speed selection set at the specification requirements (normally 2±0.1 inches per minute). As the cylinder is activated, the piston is drawn down at this speed, peeling back the copper strip to which gauge means 4 is attached. Again since the gauge means is free to move in a horizontal plane, the gauge and clamp will center themselves over the peel strip as the cylinder moves downward and pulls the strip from the sample. The next step is for the operator to read the minimum load, and then repeat the procedure with the next strip of copper on Sample "A". Note that there is no need to reclamp the sample into a new position on holddown plate 3.

If the test calls for an elevated temperature, the vacuum plate 3 is replaced by the heating element 36 and holddown plate 3'. The sample "B" as mentioned hereinbefore is placed in an inverted position within the recessed region 38 of plate 3' and held in position by offsetting spring means 41. Plate 3' is then inverted into position on heating element means 36 so that the peeled back strips are clearly visible and reachable through slotted openings 37. Aluminum shims or spacers (not shown) are placed between the sample and the surface of heating element means 36 to facilitate heat transfer. The heating element means 36, which is resting on work plate 15, and holddown plate means 3' is now clamped into position by hand bolts 20' and blocks 35. The heating element is activated, causing plate 3' to heat up to the temperature under which the test is to be carried on. The apparatus is now ready for clamping of each strip of copper to clamping means 57, for operation of the cylinder, and for the reading of the minimum load.

Although we have described our invention with a certain degree of particularity, it is understood that the present disclosure has been made only by way of example and that numerous changes in details of construction and the combination and arrangement of parts may be resorted to without departing from the spirit and scope of the invention as hereinafter claimed.

We claim:

1. In an apparatus for testing laminate bonds the combination comprising a vertically movable supporting member, said supporting member including means for movement thereof vertically at predetermined rates of speed, a holddown plate means affixed to the upper end of said movable member adapted to hold laminates thereon, a tension gauge means disposed above said holddown plate means, gauge-supporting means positioned above said gauge means, said gauge-supporting means permitting said gauge means to move freely in all directions in a horizontal plane during testing of said bonds, and laminate clamping means attached to the lower end of said gauge means whereby a laminated article to be tested can be clamped therein for exertion of a constant, completely vertically imposed separatory force between said freely, horizontally movable gauge supporting means and said laminated article.

2. The apparatus of claim 1 further characterized in that said movable supporting member is caused to move by pneumatic cylinder means.

3. The apparatus of claim 1 further characterized in that said movable supporting member has a horizontal work plate attached to the upper end thereof, whereby said holddown plate means can be temporarily attached thereto.

4. The apparatus of claim 1 further characterized in that said holddown plate means comprises a vacuum plate with a plurality of hollow passageways therein, said passageways having communication with a vacuum supply means and with the center region of the upper surface of said plate, whereby articles to be tested are held into position with a vacuum pressure bond by mere placement over said center region.

5. The apparatus of claim 4 further characterized in that a sealing means is placed on the upper surface of said vacuum plate between the center region and the peripheral edge thereof, whereby an efficient vacuum bond is effectuated.

6. The apparatus of claim 4 further characterized in that projections transverse to the upper surface of said vacuum plate are located between said center region and the peripheral edge thereof to provide for placement means, whereby articles to be located in said center region thereof, are placed to abut said transverse projections.

7. In an apparatus for testing laminate bonds the combination comprising a vertically movable supporting member, said supporting member including means for movement thereof vertically at predetermined rates of speed, a holddown plate means affixed to the upper end of said movable member adapted to hold laminates thereon, said holddown plate means comprising a flat plate with a center-recessed region having a slotted surface, the slots of said slotted surface being in communication with the opposite side of said plate for placement of articles therein, spring means located on an interior wall of said recessed region and biased to exert pressure inwardly, whereby laminated bonded articles placed within said center region are laterally forced by said spring means to abut the opposite interior wall thereof to be held in place, said articles being accessible through said slots from said opposite side, a tension gauge means disposed above said holddown plate means, gauge supporting means positioned above said gauge means, said gauge-supporting means permitting said gauge means to move freely in all directions in a horizontal plane during testing of said bonds, and laminate clamping means attached to the lower end of said gauge means whereby a laminated article to be tested can be clamped therein for exertion of a constant, completely vertically imposed separatory force between said freely, horizontally movable gauge supporting means and said laminated article.

8. The apparatus of claim 7 further characterized in that a heating element means is attached to said holddown plate means, whereby articles to be tested can be heated to predetermined temperatures.

9. The apparatus of claim 7 further characterized in that said gauge holding means comprises a gauge mount housing and bearing assembly, a slide housing and bearing assembly, and a fixed slide bracket assembly, whereby said gauge means is attached to said gauge mount housing and bearing assembly means which is free to translate horizontally on said slide housing and bearing assembly which in turn is free to translate horizontally at right angles to said initial translation on said fixed slide bracket assembly.

10. The apparatus of claim 7 further characterized in that said gauge holding means is attached to an adjustable head means, whereby the vertical distance between said gauge means and said holddown plate means can be adjusted.